United States Patent [19]
Forster

[11] Patent Number: 5,368,527
[45] Date of Patent: Nov. 29, 1994

[54] HYDROMECHANICAL DRIVE UNIT

[75] Inventor: Franz Forster, Karlstadt-Muhlbach, Germany

[73] Assignee: Linde Aktiengesellschaft, Wiesbaden, Germany

[21] Appl. No.: 23,339

[22] Filed: Feb. 26, 1993

[30] Foreign Application Priority Data

Feb. 27, 1992 [DE] Germany ............................ 4206085

[51] Int. Cl.⁵ .............................................. F16H 47/04
[52] U.S. Cl. ........................................ 475/83; 180/242
[58] Field of Search .................. 475/83; 180/242, 305

[56] References Cited

U.S. PATENT DOCUMENTS

| | | | |
|---|---|---|---|
| 3,480,099 | 11/1969 | Nichswonger et al. | 180/44 |
| 4,132,283 | 1/1979 | McCurry | 180/66 R |
| 4,291,779 | 9/1981 | Mann et al. | 180/305 |
| 4,976,666 | 12/1990 | Meyerle | 475/83 |
| 5,207,060 | 5/1993 | Sheets | 60/483 |

FOREIGN PATENT DOCUMENTS

| | | | |
|---|---|---|---|
| 276113 | 11/1969 | Austria . | |
| 2646380 | 11/1990 | France | 475/83 |
| 2130513 | 12/1972 | Germany . | |
| 2311115 | 9/1974 | Germany | 475/83 |
| 3125122 | 1/1983 | Germany . | |

Primary Examiner—Dirk Wright
Attorney, Agent, or Firm—Webb Ziesenheim Bruening Logsdon, Orkin & Hanson

[57] ABSTRACT

A hydromechanical drive unit including a swash-plate type hydrostatic axial piston engine having a cylindrical drum located in a housing. A mechanical transmission having a housing connected to the hydrostatic axial piston engine. An output shaft extending through the drive unit having a common axis of rotation with the cylindrical drum. The transmission has an input element non-rotatably connected to the cylindrical drum and an attachment member is located on each end of the output shaft to connect the drive unit to two vehicle axles.

16 Claims, 7 Drawing Sheets

HYDROMECHANICAL DRIVE UNIT

BACKGROUND OF THE INVENTION

1. Field of the Invention

The invention relates generally to a hydromechanical drive unit for a vehicle and more particularly to a hydromechanical drive unit which is designed to be located between two driven vehicle axles and which includes a swash-plate type hydrostatic axial piston engine and a coaxial downstream mechanical transmission with an output shaft having a distal end for connection with an axle of the vehicle.

2. Description of Related Prior Art

This type of drive unit is used, for example, in construction vehicles, such as loaders and excavators to obtain a speed conversion range which will permit the operation of the vehicle at a construction site and over the road. To accomplish this result, a shiftable mechanical transmission is located downstream from the axial piston engine. A spur transmission having an input shaft connected to the shaft of the axial piston engine is generally used. The output shaft of the spur transmission is the output shaft of the hydromechanical drive unit and is located parallel to the input shaft. The drive unit is centrally located to enable the ends of the output shaft to be connected to intermediate shafts which generally function as universal shafts and are connected to the differential of a vehicle axle. These prior art hydromechanical drive units require a large number of component parts which result in high manufacturing and assembly costs. Furthermore, the use of parallel shafts results in a drive unit having large dimensions.

SUMMARY OF THE INVENTION

The object of the present invention is to provide a relatively compact hydrostatic drive unit which is constructed from a smaller number of component parts than the prior art drive units.

This object is fulfilled according to the invention by providing a swash-plate type hydrostatic axial piston engine wherein the cylindrical drum and the output shaft are coaxial. The cylindrical drum of the axial piston engine is non-rotatably connected directly to an input element of the transmission without an intermediate connection to a shaft and is mounted in the housing of the axial piston engine. The output shaft of the axial piston engine extends completely through the axial piston engine and the transmission and the ends of the shaft extend out of the hydromechanical drive unit. A non-positive or a positive attachment device is provided on each end of the shaft.

The invention provides a hydromechanical drive unit wherein the output shaft extends completely through the axial piston engine and the mechanical transmission. This arrangement has relatively fewer component parts and is smaller in size than prior art drive units.

In a first embodiment of the invention, the axial piston engine and the mechanical transmission are located adjacent to each other and the output shaft has a first bearing in the end of the transmission housing spaced from the axial piston engine and a second bearing in the end of the axial piston engine housing spaced from the transmission. This arrangement provides a drive unit which is radially compact. Additionally, the distance between the output shaft bearings reduces the load on the bearings so that less expensive bearings can be used.

The mechanical transmission can, for example, be a spur transmission, but it is particularly advantageous if the transmission is a planetary transmission having a sun gear non-rotatably connected to the cylindrical drum of the swash-plate type hydrostatic axial piston engine and a non-rotatable ring gear located at the inner surface of the planetary transmission housing. The planetary transmission carrier is non-rotatably connected to the output shaft. Thus, only a single common rotational axis is required. If desired, a cyclic transmission can be used instead of a planetary transmission.

According to another embodiment of the invention, the planetary transmission has at least two stages and the output element of the first stage is formed by its carrier which is non-rotatably connected to the sun gear of the second stage and the carrier of the second stage is non-rotatably connected to the output shaft. A common ring gear is provided for both stages which provides a large range of reductions. The common ring gear for both stages of the planetary transmission can be formed directly on the inner surface of the planetary transmission housing, which simplifies the manufacture and assembly of the hydromechanical drive unit, or it can be attached to the inner surface of the transmission housing. Single stage transmission, a two stage transmission or a transmission having more than two stages be used and can be designed to be shiftable under load.

According to another embodiment of the invention, a component having hydraulic-medium channels formed therein is located in the region of the control surface of the axial piston engine. A gear element is attached to the component or the gear element is formed as a part of the component. In this arrangement, as distinguished from prior art drive units, the transmission is longitudinally adjacent to the end of the axial piston engine facing the control surface onto which the hydraulic-medium channels open rather than being longitudinally adjacent to the swash plate end of the axial piston engine.

The gear element can be a gear in a spur transmission or a friction wheel in a friction transmission. However, to obtain minimal dimensions, it is advantageous if the transmission is a planetary transmission having at least one stage and the gear element is a ring gear of the planetary transmission. The cylindrical drum is non-rotatably connected to the sun gear and the carrier is connected to the output shaft of the unit. It is also possible to provide other components of the planetary transmission such as the sun gear or the carrier as the gear element. A cyclic transmission can be used instead of a planetary transmission.

An arrangement wherein the ring gear is axially located between the control surface facing the axial piston engine and the face of the cylindrical drum facing the control surface is particularly advantageous. In this arrangement, the ring gear is provided with holes for connecting the working pistons with the hydraulic-medium channels opening onto the control surface. Such an arrangement is only slightly longer than a prior art axial piston engine. If the external diameter of the ring gear does not exceed the external diameter of the cylindrical drum or exceeds it only insignificantly, the radial dimensions of the drive unit will not exceed the radial dimensions of an axial piston engine.

In the arrangement, wherein the transmission is shiftable, it is advantageous if the ring gear can be rotatably connected by shiftable couplings with the cylindrical drum and/or with a stationary part of the housing. It is advantageous for the couplings to be shiftable under load. A first shiftable coupling has at least one annular plate non-rotatably connected to the external surface of the cylindrical drum and axially movable relative to the surface of the ring gear facing the cylindrical drum. In this manner, the ring gear can be coupled to the cylindrical drum and the axial piston engine is shifted to direct drive, i.e., the output shaft of the hydromechanical drive unit has the same speed as the speed of the cylindrical drum of the axial piston engine. The annular plate may be shifted toward the surface of the ring gear facing the cylindrical drum by a spring-loaded hydraulically releasable device to shift to direct drive when the device is no longer under pressure.

Provision is made, according to another embodiment of the invention, for a second shiftable coupling having at least one annular plate located in a ring groove formed in the inner surface of the housing. The annular plate is non-rotatably connected to the housing and is axially movable relative to the surface of the ring gear facing the housing. When the finest coupling is released and the second coupling is engaged, the ring gear is non-rotatably connected to the housing of the axial piston engine. Since the cylindrical drum is rotatable relative to the ring gear in this shift position, but is non-rotatably connected to the sun gear, the drive system is in a reduction mode.

It is advantageous if the annular plate of the second coupling is shiftable toward the surface of the ring gear facing the housing by at least one spring-loaded hydraulically releasable device.

Independently of which embodiment of the invention is used in the drive unit, the cylindrical drum of the axial piston engine is mounted on the output side of the gear shaft. However, it has proved to be advantageous if the cylindrical drum is mounted on the internal surface of the housing of the axial piston engine. The space thus saved within the cylindrical drum can be used for an output shaft having an increased diameter which can transfer a large torque.

Advantageously, the cylindrical drum is mounted in a bearing spaced axially from the sun gear of the planetary transmission and an additional bearing point is formed by the sun gear of the planetary transmission.

A complete understanding of the invention will be obtained from the following description when taken in connection with the accompanying drawings wherein like reference characters identify like parts throughout.

DESCRIPTION OF THE PREFERRED EMBODIMENTS

Figure 1:
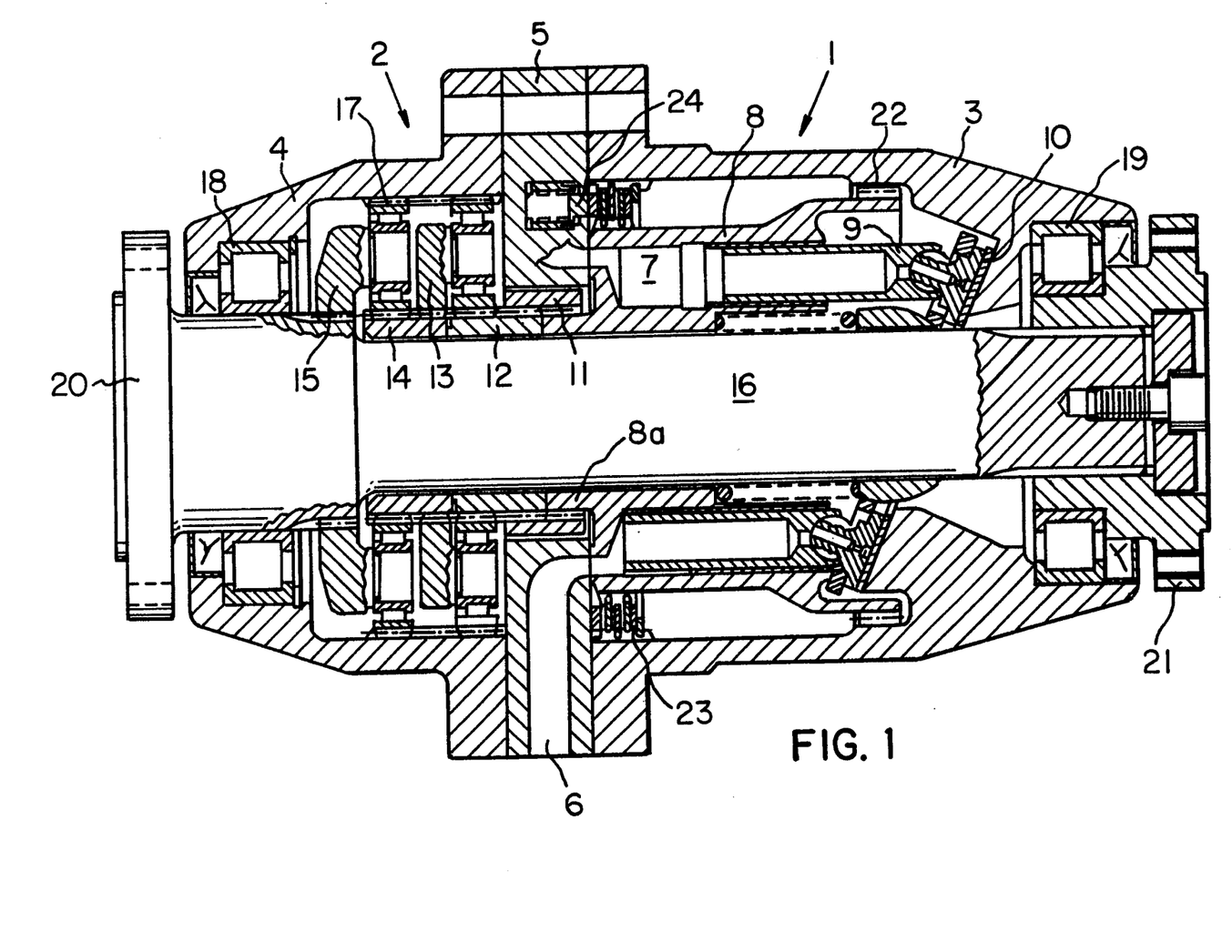
FIG. 1 is a longitudinal section through a hydromechanical drive unit according to the invention.

The hydromechanical drive unit shown in FIG. 1 of the drawings includes a swash-plate type hydrostatic axial piston engine 1 and a two-stage planetary transmission 2 positioned axially adjacent to and coaxial with the axial piston engine. The housing 3 of axial piston engine 1 and the housing 4 of the planetary transmission are both attached to a central radially extending flange 5, which has hydraulic-medium channels 6 formed therein which open onto a control surface for connection to working cylinders 7 of a cylindrical drum 8.

Working pistons 9 are longitudinally movable in working cylinders 7 by a hydraulic medium under pressure and an end of each working piston is supported against a swash plate 10. Since the angle between the swash plate 10 and the rotational axis of cylindrical drum 8 is constant, the axial piston engine has a constant volumetric absorption. It is, however, possible to use an axial piston engine with a variable volumetric absorption in which case the swash plate is pivotable and the angle between the swash plate and the rotational axis of the cylinder drum is adjustable.

Cylindrical drum 8 is non-rotatably connected to a sun gear 12 of the first stage of the planetary transmission by a gear 8a formed on the cylindrical drum and a coaxial shell 11 having axial splines formed on its inner surface. The carrier 13 of the second stage of the planetary transmission is non-rotatably connected to a sun gear 14 of the second stage of the planetary transmission. The carrier 15 of the second stage of the planetary transmission is non-rotatably connected to an output shaft 16 on the transmission side of the drive unit. Both stages of the planetary transmission have a common ring gear 17 formed at or on the inner surface of planetary gear housing 4.

Output shaft 16 extends completely through the hydromechanical drive unit and out of each end thereof. Bearings 18 and 19 are provided at the opposite ends of shaft 16. A flange 20 is formed on the transmission end of output shaft 16 shown in FIG. 1 of the drawings for connection with an axle which is to be driven. A flange 21 is attached to the piston engine end of output shaft 16 for connection with another axle which is to be driven.

The connection between cylindrical drum 8 and sun gear 12 of the first stage of the planetary transmission supports one end of the cylindrical drum in the radial direction. An additional support for cylindrical drum 8 is provided by a bearing 22 which is located between the external surface of the opposite end of cylindrical drum 8 and the internal surface of housing 3 of axial piston engine 1 in the region of swash plate 10. External bearing 22 permits output shaft 16 to have a constant diameter allowing full torque to be obtained on both ends of the output shaft. Spaced annular brake plates 23 are radially located between the external surface of cylindrical drum 8 and the internal surface of housing 3. The plates are alternatively non-rotatably connected to housing 3 and to cylindrical drum 8 and are operatively connected to brake pistons 24 which are located in central flange 5.

In contrast with the arrangement shown in FIG. 1 of the drawings, it is possible to use a planetary transmission 2 with a single stage.

Figure 2:
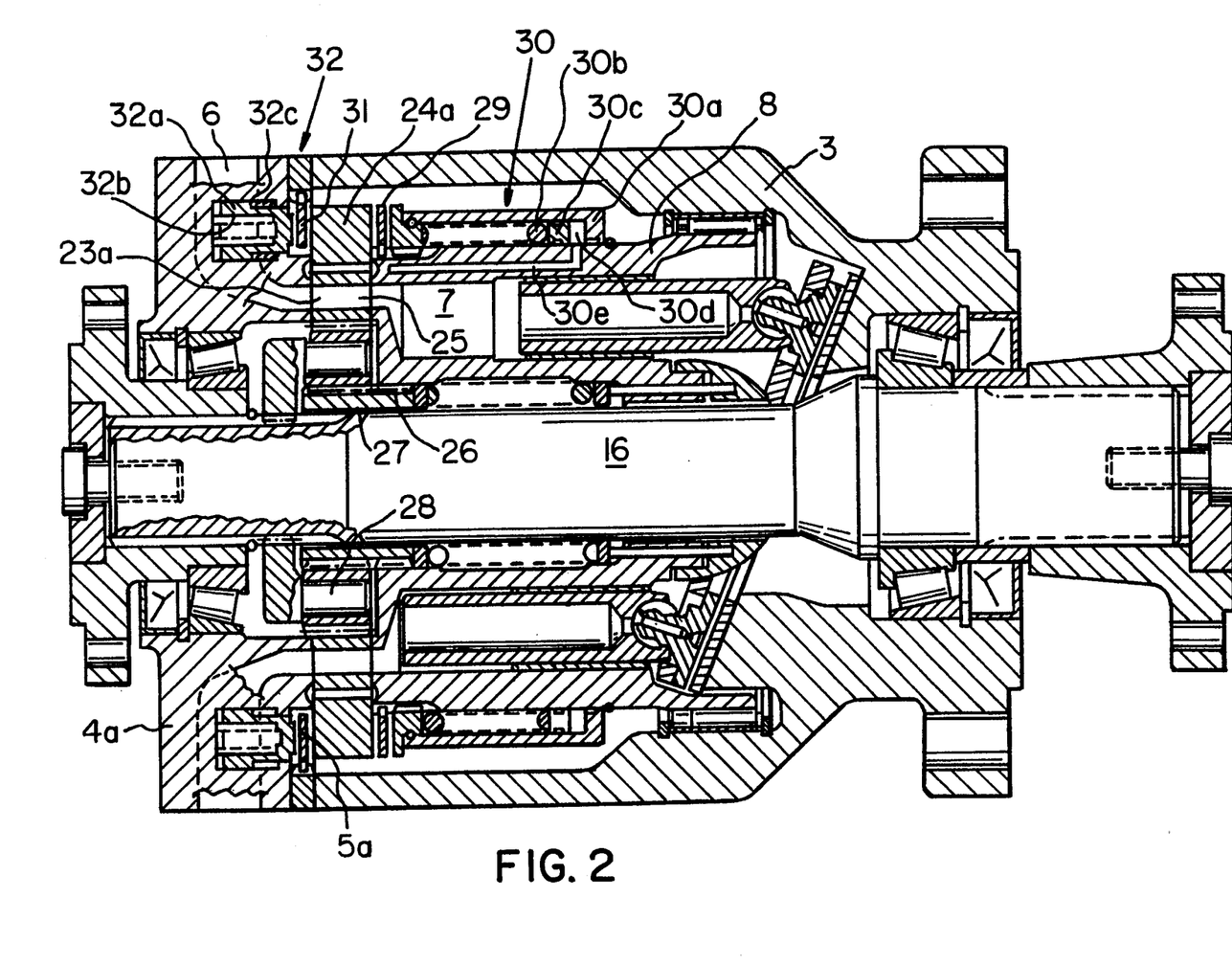
FIG. 2 is a longitudinal section through a second embodiment of a hydromechanical drive unit according to the invention.

The embodiment of the hydromechanical drive unit shown in FIG. 2 of the drawings has hydraulic-medium channels 6 formed in housing 4a which open on a control surface 23a which is formed on the surface of the housing. Control surface 23a can also be formed on a separate disk which is attached to the surface of housing 4a. In such an arrangement, the surface of housing 4a functions as a control surface base.

A ring gear 24a of a planetary transmission is located between control surface 23a and the opposing face of cylindrical drum 8. Ring gear 24a is provided with holes 25 which connect hydraulic-medium channels 6 in end flange 5a with working cylinders 7 of cylindrical drum 8. The planetary transmission has a sun gear 26 which is non-rotatably connected to cylindrical drum 8. Planet gears 27 are mounted on a carrier 28 which is non-rotatably connected to output shaft 16.

The external diameter of ring gear 24a is slightly greater than the external diameter of cylindrical drum 8 and an annular plate 29 surrounds the external surface of the cylindrical drum. Annular plate 29 is non-rotatably connected to the cylindrical drum 8 and is axially shiftable along the cylindrical drum relative to ring gear 24a by a spring-loaded hydraulically releasable device 30. Device 30 has a hollow annular cylinder 30a which is urged toward the surface of annular plate 29 which faces cylinder 8 by a spring 30b. Spring 30b is supported against a stationary annular piston 30c and an annular space 30d is located between annular piston 30c and annular cylinder 30a. Annular space 30d is connected to a hydraulic-medium channel 30e. When channel 30e and annular space 30d are filled with a pressurized hydraulic-medium annular cylinder 30a is moved into the position shown in FIG. 2 of the drawings and plate 29 is released.

An annular plate 31 is located opposite the surface of ring gear 24a which faces the end of housing 4a. A plate 31 is located in an axial ring groove formed in the inner circumferential surface of flange 5a and is shifted axially by a spring-loaded hydraulically releasable device 32 having axially movable pistons 32a. Each piston 32a is urged toward annular plate 31 by the force of a spring 32b located in the piston and is moved away from plate 31 by filling annular space 32c with a hydraulic medium under pressure.

In operation, when devices 30 and 32 of the drive unit shown in FIG. 2 of the drawings are acted on by a hydraulic medium under pressure, annular plates 29 and 31 are urged away from a surface of ring gear 24a and the couplings are open. Consequently, ring gear 24a is freely rotatable and the hydromechanical drive unit is in a free-wheeling mode and no torque is transmitted to output shaft 16. When the couplings are closed by removing the pressurized hydraulic medium from devices 30 and 32, ring gear 24a is non-rotatably connected with both end flange 4a and cylindrical drum 8. Consequently, the hydromechanical drive unit is in a braking mode and the planetary transmission acts as a locking mechanism.

If ring gear 24a is non-rotatably connected to only cylindrical drum 8, cylindrical drum 8, ring gear 24a, and sun gear 26 all rotate at the same speed. Consequently, planet gears 27 do not rotate around their rotational axes but rotate with carrier 28 at the same speed as the elements mentioned and the hydromechanical drive unit is in a direct drive mode.

When ring gear 24a is non-rotatably connected to only housing 4a, the arrangement corresponds to a stationary ring gear fixed on the housing. Consequently, the speed of sun gear 26 is reduced and carrier 28 and output shaft 16 rotate with a lower speed than sun gear 26.

Figure 3:
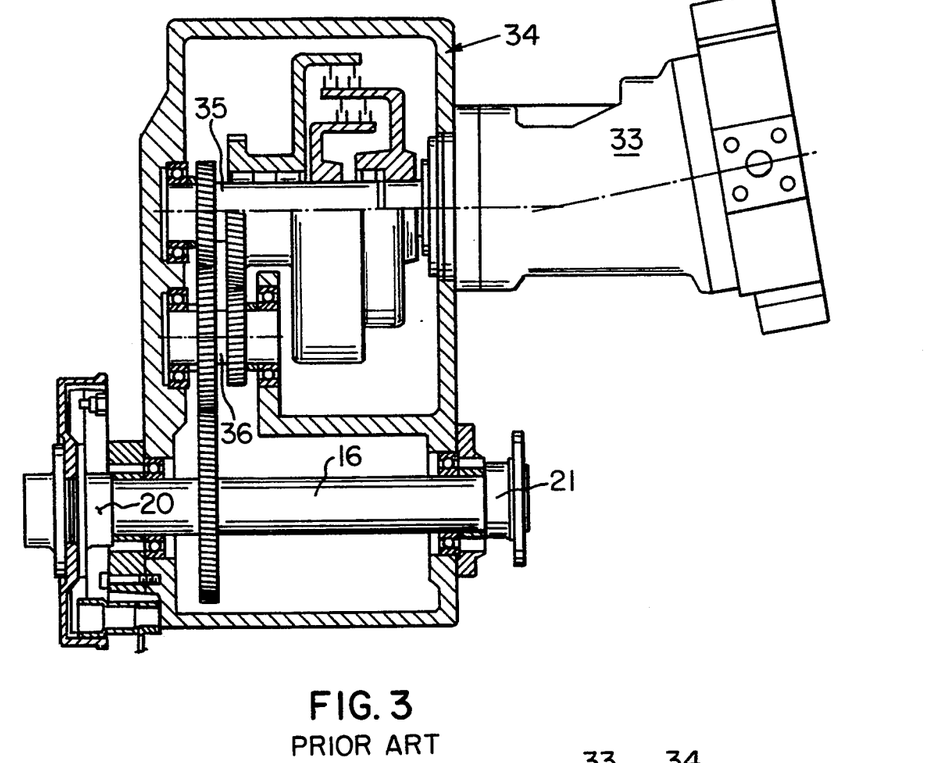
FIG. 3 is a partial section showing a prior art hydromechanical drive unit.

FIG. 3 of the drawings shows a prior art hydromechanical drive unit wherein a swash-plate type axial piston engine 33 drives a shiftable spur transmission 34. The spur transmission has an output shaft 16 and a parallel two-part input shaft 35 with shift couplings and spur gears and an intermediate shaft 36 located parallel thereto. The output shaft is provided with flanges 20 and 21 and a brake is located adjacent to flange 20.

Figure 4:
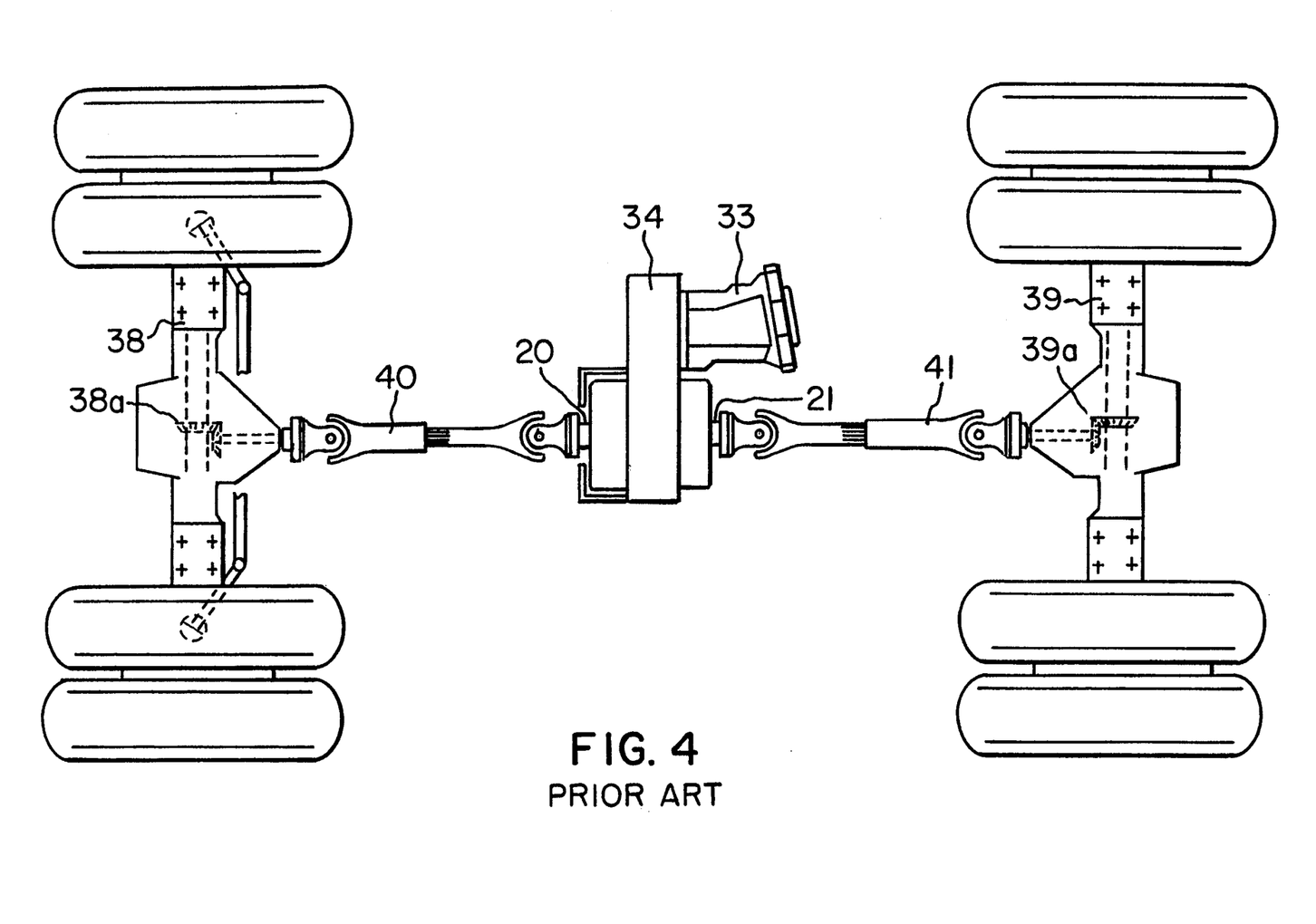
FIG. 4 shows a prior art drive unit according to FIG. 3 in mobile excavator drive train.

FIG. 4 of the drawings shows a prior art drive unit in a mobile excavator. The drive unit is attached, in a manner not shown, to the vehicle frame between a front axle 38 and a rear axle 39. A universal shaft 40 runs from the differential 38a of front axle 38 to the flange 20 of the output shaft of the drive unit. A universal shaft 41 runs from the differential 39a of rear axle 39 to the flange 21 of the output shaft of the drive unit.

Figure 5:
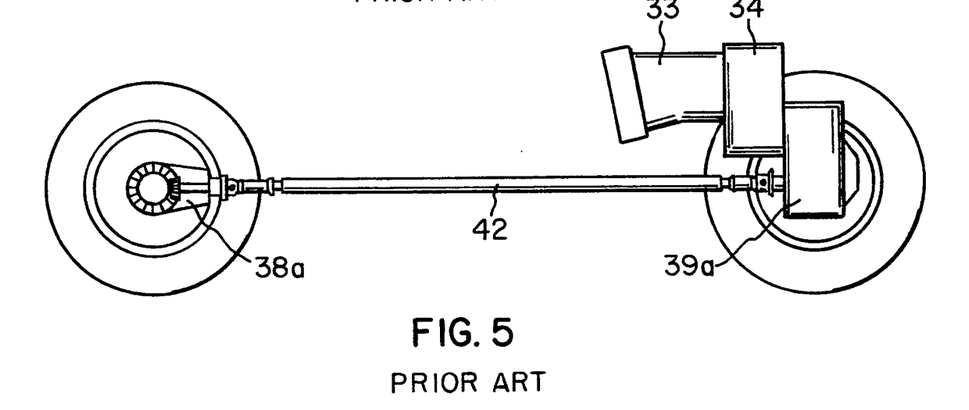
FIG. 5 is a variation of the prior art drive train shown in FIG. 4.

In the prior art arrangement shown in FIG. 5 of the drawings, a drive unit is connected to a differential 39a for the rear vehicle axle. An intermediate shaft 42 leads from differential 39a to a differential 38a for front axle.

Figure 6:
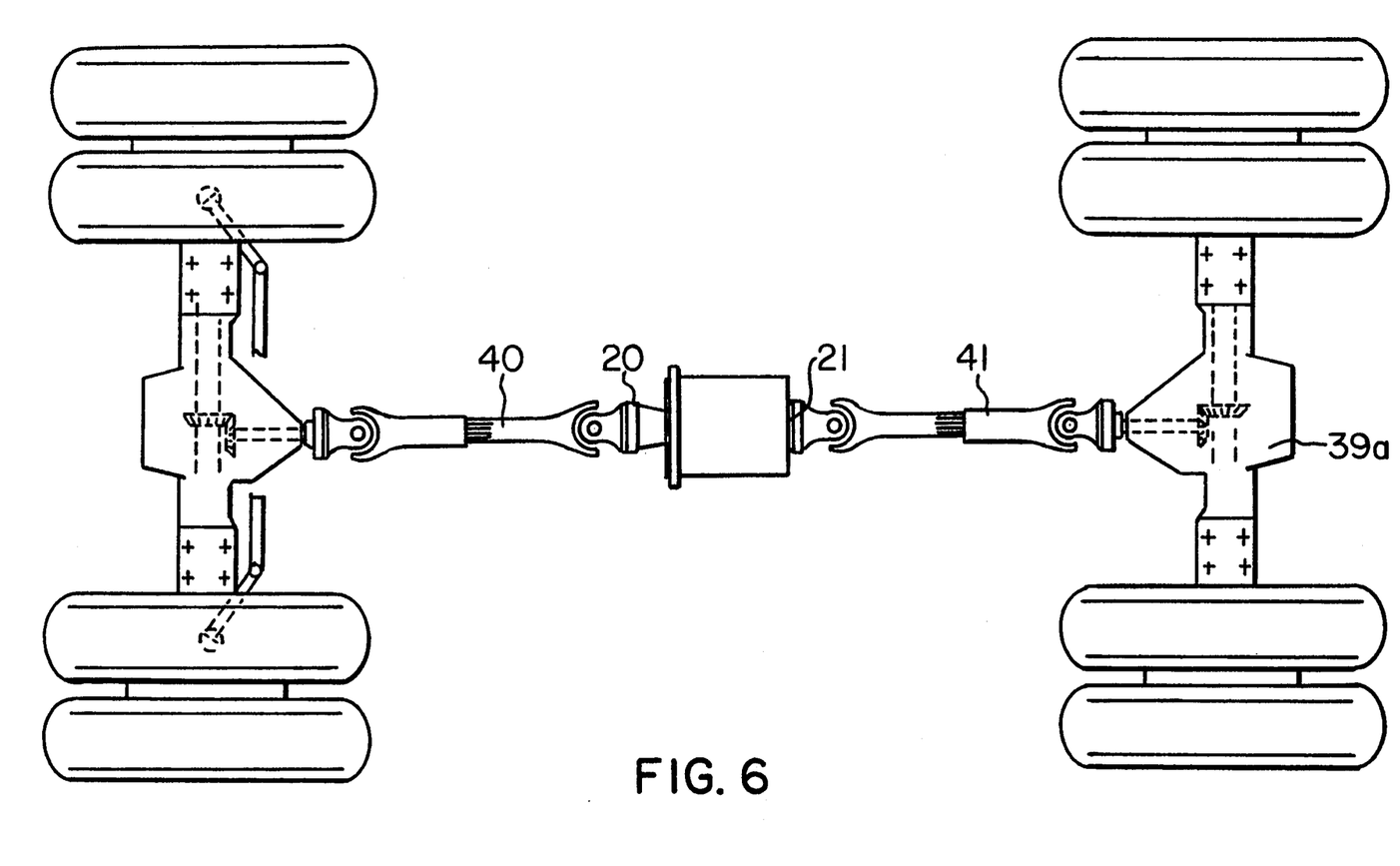
FIG. 6 is an assembly showing the drive unit shown in FIG. 2 in a drive train of a mobile excavator.

FIG. 6 shows a hydromechanical drive unit according to the second embodiment of the invention connected in the drive train of a mobile excavator. The drive unit is located directly in the drive shaft line.

Figure 7:
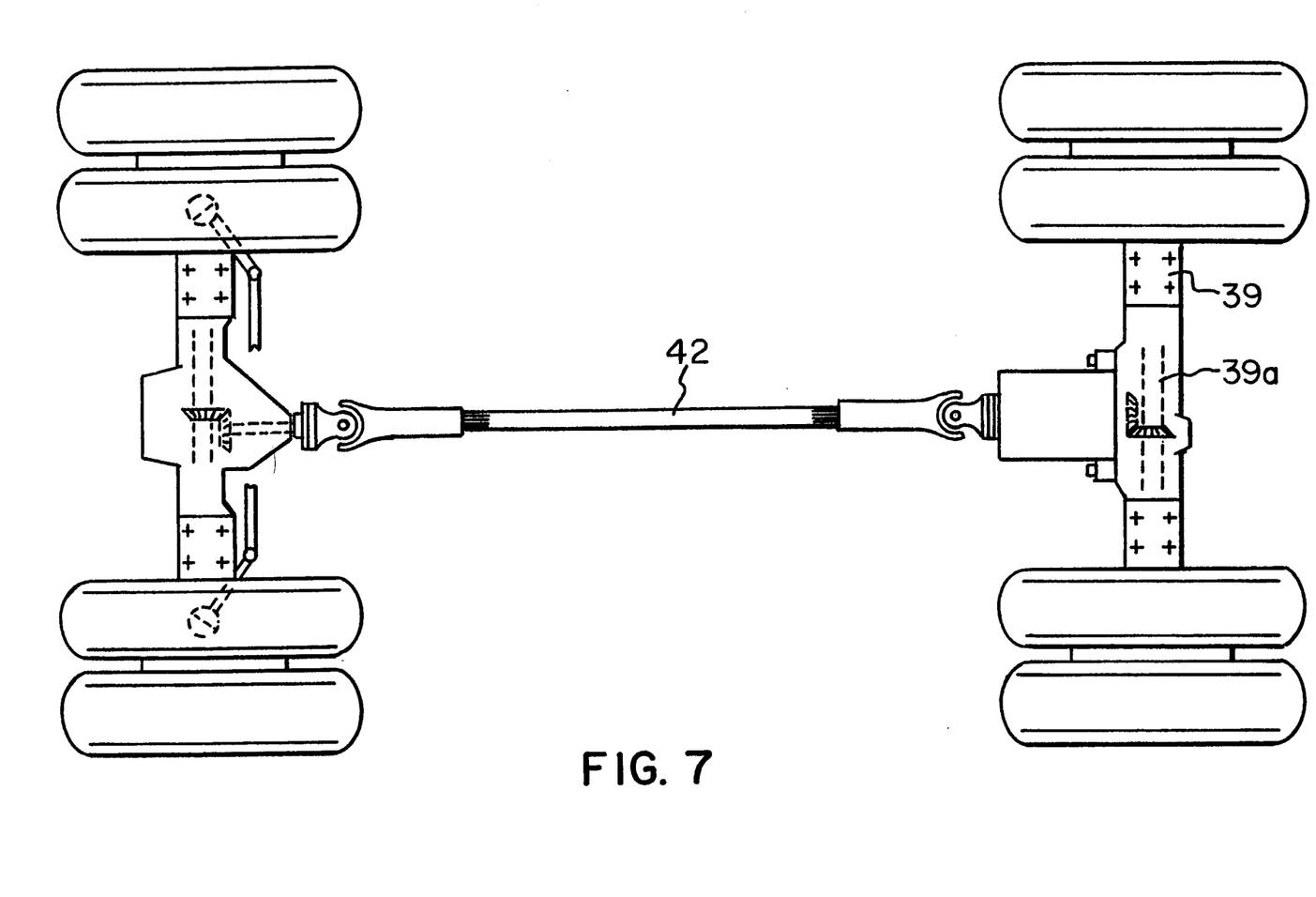
FIG. 7 is a variation of the drive train shown in FIG. 6.

In the arrangement shown in FIG. 7 of the drawings, the drive unit is directly attached to a flange on a differential 39a for rear axle 39 of the vehicle.

Figure 8:
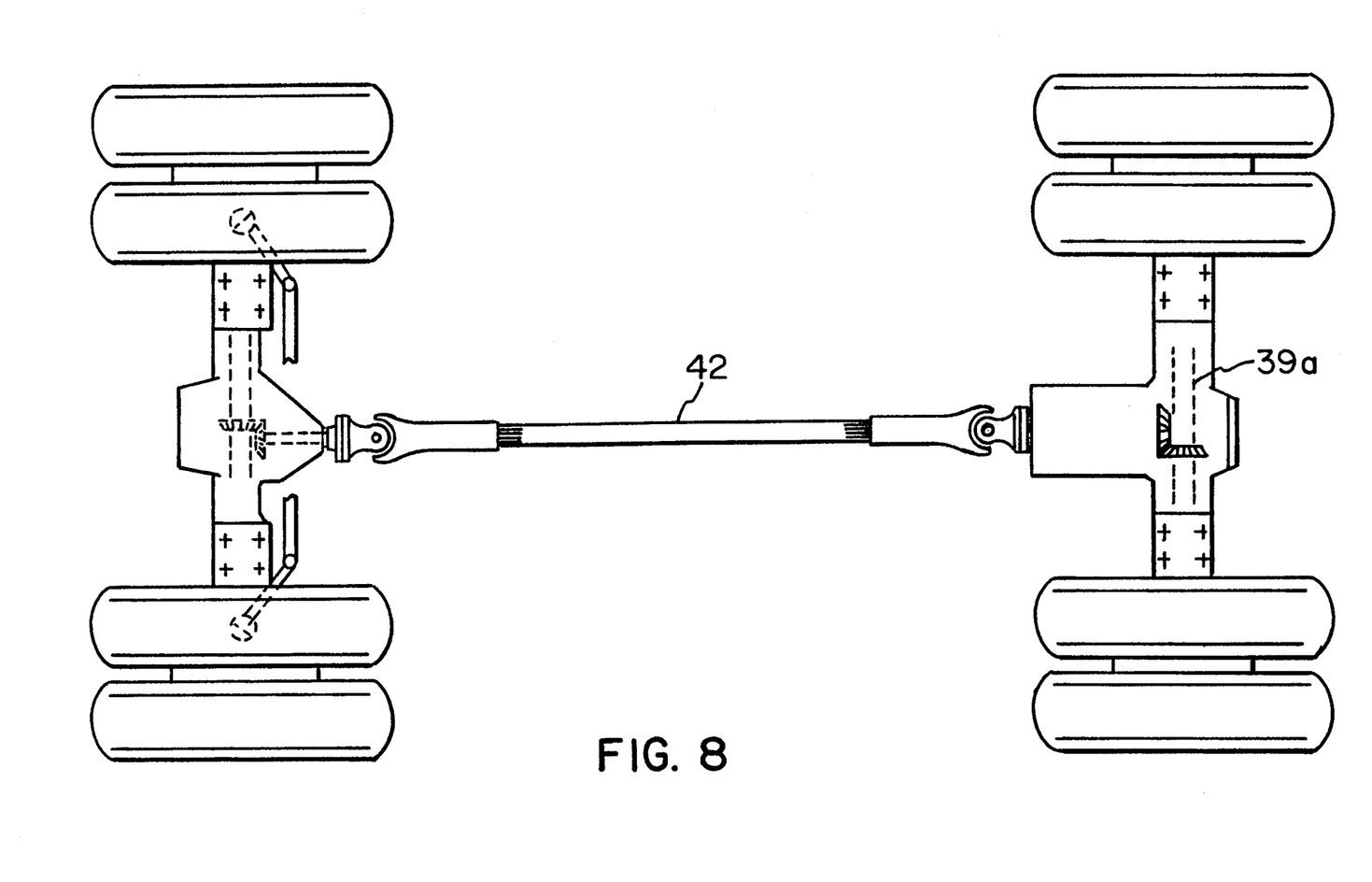
FIG. 8 is another variation of the drive train shown in FIG. 6.

As shown in FIG. 8 of the drawings, the housing of differential 39a can be integral with the housing of the hydromechanical drive unit. A drive shaft 42 extends from the integral housing to the differential of the front axle.

While specific embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A hydromechanical drive unit for driving two driven axles of a vehicle, said hydromechanical drive unit having a swash-plate type hydrostatic axial piston engine having an external housing and a cylindrical drum located in said housing and a mechanical transmission having an external housing and an input element, means for connecting said mechanical transmission to said hydrostatic axial piston engine, an output shaft extending completely through said hydromechanical drive unit and having opposite ends adapted to be connected with vehicle axles, wherein the rotational axes of said cylindrical drum and said output shaft coincide, said cylindrical drum of said axial piston engine non-rotatably connected to said input element of said mechanical transmission and attachment means on each end of said output shaft for connection with an axle of a vehicle.

2. A hydromechanical drive unit as set forth in claim 1 wherein said attachment means on each end of said output shaft is a flange.

3. A hydromechanical drive unit as set forth in claim 1 including a first bearing for said output shaft located in said transmission at the end of said transmission spaced from said axial piston engine and a second bearing in said axial piston engine at the end of said axial piston engine spaced from said mechanical transmission.

4. A hydromechanical drive unit as set forth in claim 3 wherein said mechanical transmission is a single stage planetary transmission including a sun gear, means for non-rotatably connecting said sun gear to said cylindrical drum of said axial piston engine, a ring gear non-rotatably connected to said housing of said planetary transmission, a carrier and means for non-rotatably connecting said carrier to said output shaft.

5. A hydromechanical drive unit as set forth in claim 4 wherein said planetary transmission includes a second axially aligned stage, said second stage of said planetary transmission having a sun gear non-rotatably connected to said carrier, a carrier non-rotatably connected to said output shaft and a common ring gear for said first stage and said second stage of said planetary transmission.

6. A hydromechanical drive unit as set forth in claim 1 including a component having hydraulic-medium channels formed therein and a control surface located at a surface of said component, whereby said channels open on said control surface.

7. A hydromechanical drive unit as set forth in claim 6 wherein said ring gear and said cylindrical drum are non-rotatably connected to said sun gear and said carrier is connected to said output shaft.

8. A hydromechanical drive unit as set forth in claim 7 wherein said ring gear is located axially between said control surface and the end surface of said cylindrical drum facing said control surface and a plurality of radially spaced axial holes extending through said ring gear to provide working cylinders located in said cylindrical drum with hydraulic fluid from said hydraulic-medium channels opening on said control surface.

9. A hydromechanical drive unit as set forth in claim 8 including axially shiftable non-rotatable couplings on opposite sides of said ring gear for connecting said ring gear to at least one of said cylindrical drum and said transmission housing.

10. A hydromechanical drive unit as set forth in claim 9 wherein said shiftable couplings include a first shiftable coupling having at least one annular plate non-rotatably connected to the external surface of said cylindrical drum and axially movable relative to the surface of said ring gear facing said cylindrical drum.

11. A hydromechanical drive unit as set forth in claim 10 including a spring-loaded hydraulically releasable mechanism for shifting said at least one annular plate toward the surface of said ring gear facing said cylindrical drum.

12. A hydromechanical drive unit as set forth in claim 10 wherein said shiftable couplings include a second shiftable coupling having at least one annular plate, an annular ring groove formed in said transmission housing, said at least one annular plate of said second shiftable coupling non-rotatably connected to said housing in said ring groove and means for moving said annular plate toward the surface of said ring gear facing said transmission housing.

13. A hydromechanical drive unit as set forth in claim 12 wherein means for moving said annular plate is a spring-loaded hydraulically releasable mechanism.

14. A hydromechanical drive unit as set forth in claim 4 including means for supporting the external surface of said cylindrical drum on the internal surface of said housing of said axial piston engine.

15. A hydromechanical drive unit as set forth in claim 14 wherein said means for supporting said external surface of said cylindrical drum is a bearing axially spaced from said sun gear and wherein said gear functions as an additional bearing for said cylindrical drum.

16. A hydromechanical drive unit as set forth in claim 14 wherein said means for supporting said external surface of said cylindrical drum is a bearing axially spaced from said sun gear and wherein said shaft functions as an additional bearing for said cylindrical drum.

* * * * *

UNITED STATES PATENT AND TRADEMARK OFFICE
CERTIFICATE OF CORRECTION

PATENT NO. : 5,368,527
DATED : November 29, 1994
INVENTOR(S) : Franz Forster

It is certified that error appears in the above-indentified patent and that said Letters Patent is hereby corrected as shown below:

Column 3 Line 20 "finest" should read --first--.

Claim 15 Line 33 Column 8 "wherein said gear" should read --wherein said sun gear--.

Signed and Sealed this

Twenty-first Day of February, 1995

Attest:

BRUCE LEHMAN

Attesting Officer

Commissioner of Patents and Trademarks